United States Patent [19]

Debarge

[11] Patent Number: 4,558,655
[45] Date of Patent: Dec. 17, 1985

[54] SAIL UNIT FOR THE PURPOSE OF SPORT AND COMPOSITE DEVICE RELATED TO SAID UNIT

[76] Inventor: Philippe Debarge, c/o T.C.F., 2 Quai de la Conférence, 75008 Paris, France

[21] Appl. No.: 577,625
[22] PCT Filed: May 18, 1983
[86] PCT No.: PCT/FR83/00095
§ 371 Date: Jan. 17, 1984
§ 102(e) Date: Jan. 17, 1984
[87] PCT Pub. No.: WO83/04235
PCT Pub. Date: Dec. 8, 1983

[30] Foreign Application Priority Data

May 25, 1982 [FR] France .................... 82 09102

[51] Int. Cl.[4] ............................................. B63H 9/06
[52] U.S. Cl. ...................................... 114/39; 114/93; 114/102
[58] Field of Search .................. 114/102, 103, 39.1, 114/39.2, 93; 244/DIG. 1.3, DIG. 1.4

[56] References Cited

U.S. PATENT DOCUMENTS

| | | | |
|---|---|---|---|
| 2,319,999 | 5/1943 | Jennings | 114/102 |
| 3,083,933 | 4/1963 | Cella | 114/253 |
| 3,700,191 | 10/1972 | Page | 244/16 |
| 3,844,238 | 10/1974 | Murray | 114/39.1 |
| 3,858,542 | 1/1975 | Lenoble | 114/103 |
| 3,863,868 | 2/1975 | Oberle | 244/16 |
| 3,924,870 | 12/1975 | Spivack et al. | 114/103 |
| 4,344,377 | 8/1982 | Gram | 114/103 |
| 4,473,022 | 9/1984 | Eastland | 114/102 |

FOREIGN PATENT DOCUMENTS

| | | | |
|---|---|---|---|
| 0070673 | 1/1983 | European Pat. Off. | 114/39.2 |
| 2738469 | 3/1979 | Fed. Rep. of Germany | 114/39.2 |
| 2409189 | 6/1979 | France | 114/39.2 |
| 2457213 | 12/1980 | France | 114/39.2 |
| WO79/01077 | 12/1979 | PCT Int'l Appl. | 114/102 |
| WO82/03053 | 9/1982 | PCT Int'l Appl. | 114/39.2 |

OTHER PUBLICATIONS

"Hang-Gliding Review", Flight International, Dec. 10, 1977, by Ann Welch.
"Hang Gliders", Popular Science, Jun. 1972, by Paul Wahl.

Primary Examiner—Trygve M. Blix
Assistant Examiner—Edwin L. Swinehart
Attorney, Agent, or Firm—Young & Thompson

[57] ABSTRACT

Sailboard comprising a sail assembly and a floatboard (2) supporting the sail assembly. The sail assembly comprises two wings (4, 5) in relatively displaced relation to each other, the two wings having substantially parallel leading edges (6, 7), the two wings being connected together by a rigid supporting frame ensuring a constant relative positioning of the wings. One (7) of those leading edges has an end (7a) which is removably and pivotably fixed to the floatboard (2), thus permitting the user to move the sail assembly during navigation between a position where the end (7a) of that one leading edge is pivotably fixed to the floatboard and a position where the sail assembly is dissociated from the floatboard and maintained by the user in a substantially horizontal position to produce a sustentation effect.

8 Claims, 10 Drawing Figures

SAIL UNIT FOR THE PURPOSE OF SPORT AND COMPOSITE DEVICE RELATED TO SAID UNIT

The present invention relates to a sail unit for the purpose of sport which enables the user to perform a wide range of different movements on both land and water, in particular when the sail unit is employed conjointly with a moving support for carrying the user so as to constitute a composite traveling device in conjunction with the above-mentioned sail unit.

Sailboard boards are already known and are characterized by the association of a board and a substantially triangular sail which the user operates by exerting physical force and which bears on an anchoring point of the board. These devices permit only limited movements.

It is also known to associate a sail of the spinnaker type fitted with a venturi tube and a pair of snow skis, the sail being fastened to the wrists and ankles of the user who is wearing the skis. This association permits only flying ski-jumps which are slowed-down during ski descents.

It is primarily in the field of aquatic sports that interest has focused on the use of wind power for enabling the user to obtain both propulsion or flight effects by air sustentation according to the orientation of a sail with respect to the wind, this sail being orientable in space independently of the support which carries the user. However, in known designs of this type, the sail consisting of a V-wing, for example, is relatively heavy and awkward to handle. Furthermore, its development in width is such that, in practice, it is not capable of occupying all desirable positions and in particular it can neither be inclined at a large angle with respect to the vertical nor be connected to the board by engaging the leading edge of the wing within a receptacle provided for this purpose.

The object of the present invention is to provide a highly maneuverable sail unit which permits rapid changeover from a vertical position of propulsion to a horizontal position of sustentation and conversely without any danger of touching the water.

In accordance with the invention, the sail unit provided for the purpose of sport and operable by hand in order to permit propulsion and/or flight by air sustentation according to the orientation of said sail unit as a function of the wind and with respect to a moving support for carrying the user such as a sailboard, is characterized in that it is of the multiplane type and comprises at least two wings in relatively displaced relation to each other.

An arrangement of this type makes it possible to obtain a sail unit which has a large total sail area while being of small overall size, thereby enabling the user to handle this sail unit with great ease in the different configurations of use in propulsion and/or in sustentation without any danger of touching the bearing surface such as the ground or water.

The sail unit according to the invention advantageously consists of two wings forming a biplane. This design permits simple and economical construction.

In a preferred version of the invention, the two wings are relatively displaced in a transverse direction with respect to their leading edges.

This arrangement permits optimum use of the two wings and prevents blanketing of one wing by the presence of the other on the windward side.

In an advantageous manner, the two wings have substantially the same surface area.

This makes it possible to simplify the industrial manufacture and therefore to reduce the cost price while also simplifying the assembly operation to be performed by the user since the two wings are thus interchangeable.

In a version of the invention which is of practical interest, one of the two wings has a substantially greater span than the other wing.

This arrangement permits the achievement of enhanced effectiveness of the sail unit without increasing its weight to any appreciable extent.

When used as a waterborne craft, it is an advantage to ensure that at least one of the wings is formed of positively buoyant material such as a plastic foam in sheet form. When the sail unit is immersed at the time of departure or when a fall occurs, this choice makes it possible to avoid the need to displace a large quantity of water when the user desires to lift the sail unit out of the water whereas ordinary sails have a tendency to sink to an appreciable depth in the water. Furthermore, lifting of the unit out of the water is facilitated by the fact that one of the sails will always be located above water.

In a preferred version, the two wings are joined together by means of a rigid supporting frame for ensuring constant relative positioning, this supporting frame being provided with gripping means for the user.

This rigid supporting frame permits particularly easy handling. In fact the user need only apply tractive efforts to this supporting frame in a single general orientation in the same manner as the tractive effort exerted on a kite string.

In a particularly advantageous embodiment, the moving sail-unit support comprises a positioning and adjusting device for cooperating with one end of a rod engaged in the leading edge of one of the wings of the sail unit.

Depending on the choice made by the user, this device makes it possible without exertion of any particular effort either to associate the sail unit with the moving support such as a board in the same manner as a conventional sail attached to a mast which is fixed on the moving support or to dissociate the sail unit from the device and to orient it in the three dimensions in an endeavor to produce a sustentation effect. This arrangement also permits particularly rapid and reliable tacking, utilization under light wind conditions and more effective means as well as better sailing close to the wind.

Other particular features and advantages of the invention will become more apparent from the following description.

In the accompanying drawings which are given by way of illustrative and non-limitative examples:

Figure 1:
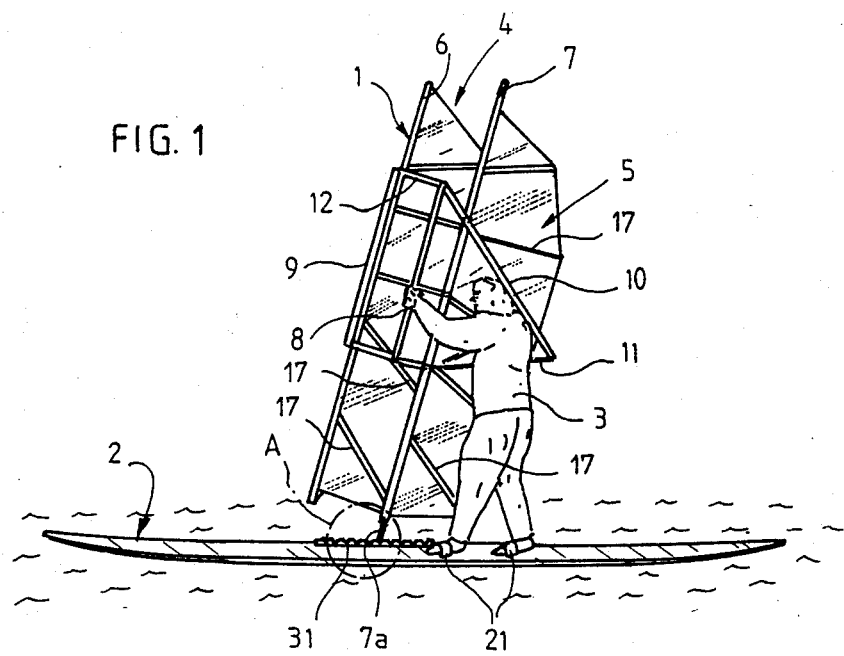
FIG. 1 is a view in elevation of a board having a biplane sail unit in accordance with the invention in the position of use.
Figure 2:
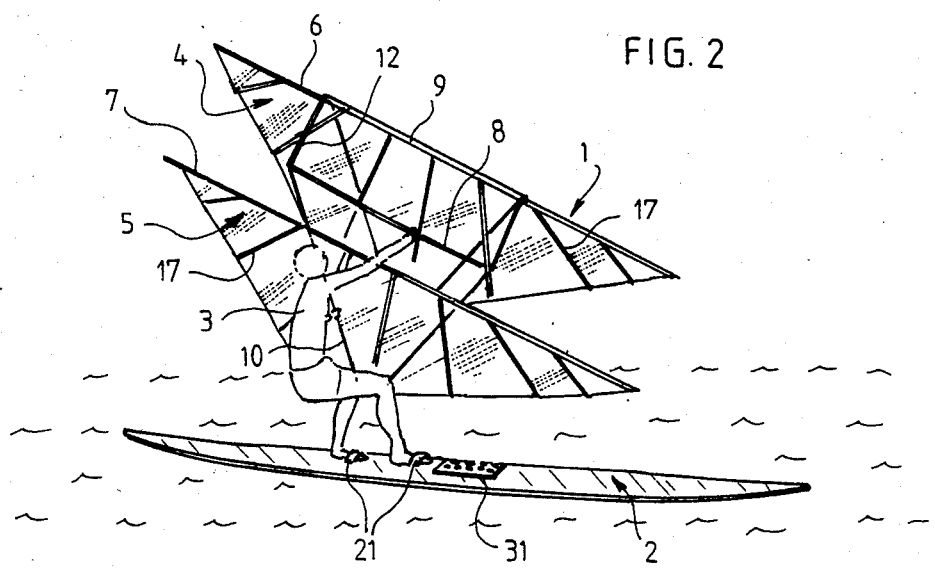
FIG. 2 is a view which is similar to FIG. 1, the sail unit being dissociated from the board.

In the embodiment of FIGS. 1 and 2, the sail board is equipped with a sail unit 1 and a board 2 controlled by a user 3 whose two feet bear on this board and who maintains the sail unit 1 with each hand closed on two elements 8, 10 forming part of the supporting frame of the sail unit 1.

Figure 3:
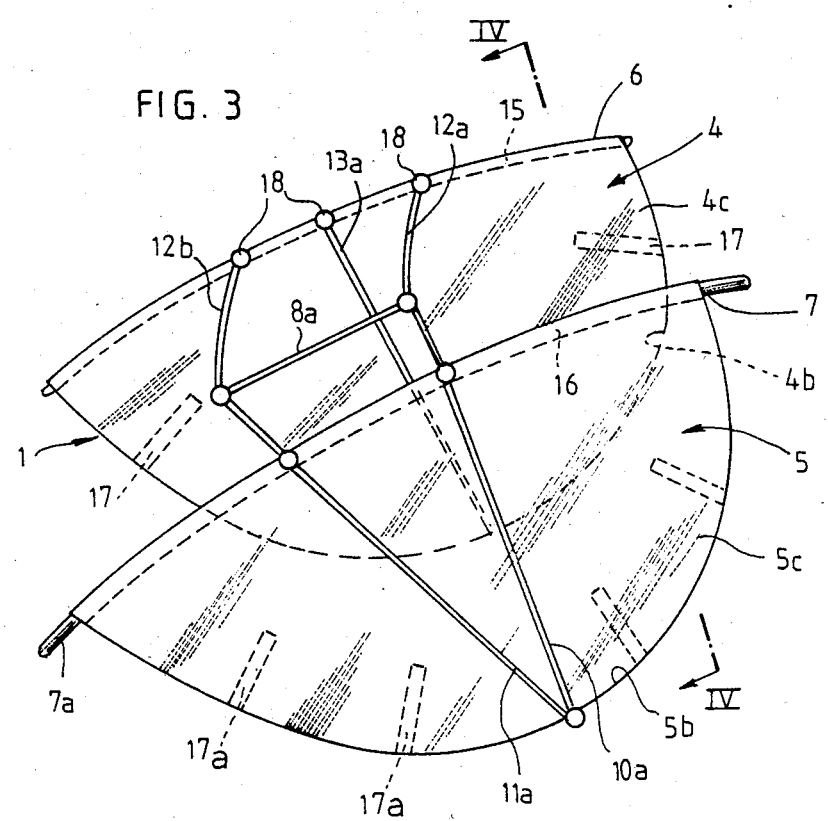
FIG. 3 is a view in perspective of one example of construction of the sail unit in accordance with the invention.
Figure 4:
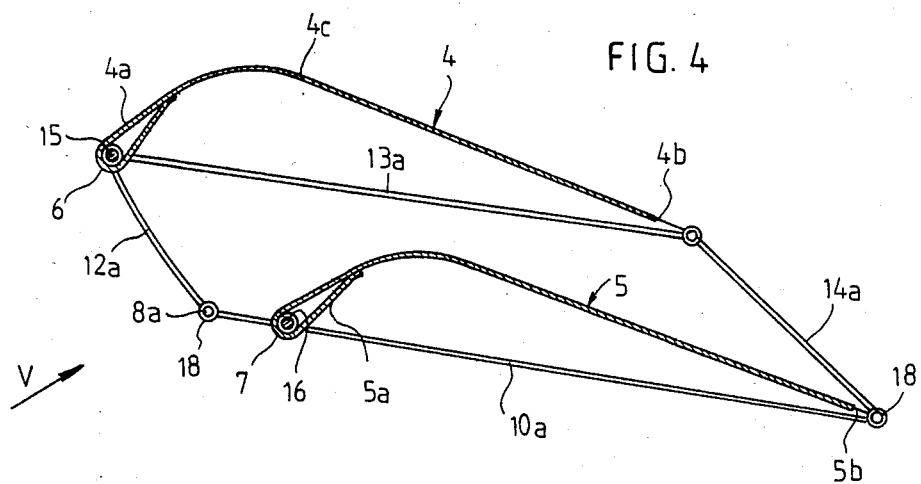
FIG. 4 is a representation of the same sail unit in a cross-sectional view taken along the plane IV—IV of FIG. 3.

This sail unit 1 comprises two wings 4, 5 each constituted by a sailcloth held in position by elements of the supporting frame which is illustrated in detail in FIGS. 3 and 4 and in which are again shown the two wings 4, 5 each having a leading edge 6, 7 and a trailing edge 4b, 5b. These wings 4, 5 are constituted by a sail cloth 4c, 5c, of which comprises a sewn sheath 4a, 5a in which is inserted a tubular rod 15, 16. The trailing edge 4b, 5b of each wing 4, 5 in this representation has an oval contour and is connected substantially at the mid-point of this contour on the one hand to a tubular rod or longitudinal member 13a in the case of the wing 4 and on the other hand to the end representing the apex of a triangle 10a, 11a, 8a also constituted by tubular rods which are connected to each other by clamping means 18.

The supporting frame comprises (FIGS. 3 and 4), in addition to the two leading edges or the tubular rods 15, 16, a longitudinal member 13a, a triangle 10a, 11a, 8a, two front upright members 12a, 12b of bent tubular rod connected at each end to the leading edges 6, 7 and a rear upright member 14a connected on the one hand to the rear end of the longitudinal member 13a and to the rear apex of the triangle 10a, 11a, 8a. These connections are made by known clamping means such as, for example, nuts 18 employed in the assembly of light tubular structures.

In the version illustrated in FIG. 3, the rear portion of each wing 4, 5 further comprises a certain number of stiffening slats 17a engaged within pockets formed in the sailcloth 4c, 5c. In the case of FIGS. 1 and 2, the slats 17 are preformed.

The plane which joins the mean line of the leading edge 6, 7 and the mid-point of the trailing edge 4b, 5b is designated by aerodynamicists as the "wing plane".

In the embodiment illustrated in FIG. 4, the wing planes 4, 5 are substantially parallel.

Each wing is substantially symmetrical with respect to a plane at right angles to the plane of the wing, the line common to these two planes being designated as the "wing axis".

The wing 5 which is joined to the triangle 10a, 11a, 8a will be designated as the "windward wing" and the other wing 4 will be designated as the "leeward wing". The leeward wing 4 is displaced with respect to the windward wing 5 in the direction of its axis and in the direction which extends from the trailing edge 4b to the leading edge 6.

Figure 1A:
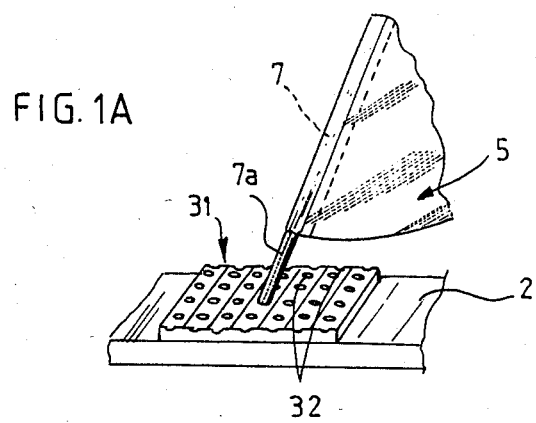
FIG. 1A is a view in perspective to a larger scale of the detail A of FIG. 1.

In FIGS. 1 and 1A, it can also be seen that one end 7a of the leading edge 7 of the wing 5 is mechanically associated with the board 2 by engagement in a receptacle 31 constituted in this example by a plurality of recesses 32 for fastening and adjustable positioning of the end 7a of the leading edge 7 and the dimensions of which are slightly larger than the diameter of this end of the leading edge 7.

These recesses 32 can be of various shapes and the receptacle 31 thus formed extends over a length of about ten centimeters or more on each side of the axis of the board 2 and over a length of about one meter or more in front of the mid-length of the board.

The pilot 3 may, although he is not obliged to do so, engage his feet within pockets made integral with the board 2 and formed of flexible material 21 of known type constituted by wide bands of plastic material.

This is the case when the pilot 3 uses a so-called "jumping" board 2 which, apart from its small dimensions and low weight, is provided with pockets 21 of this type for the feet. However, the pilot 3 may employ any type of boards such as the so-called "speed" boards or "regatta" boards which are thin and tapered but not provided with pockets 21 of this type, or even boards for gliding along the flanks of waves and known as surf-boards.

The operation of the sail unit described is as follows:

Since each wing 4, 5 (see FIG. 4) which receives the wind coming from the direction represented by way of example by the arrow V is maintained at 8a and at a central point of one of the sides 10a, 11a of the triangle 10a, 11a, 8a, the wing produces a force which, in a first approximation, is perpendicular to the plane of the wing comprising the leading edge 6, 7 and the central point of the trailing edge 4b, 5b.

In the utilization shown in FIG. 1 in which the end of the leading edge 7 is associated with the board 2, the sail unit in accordance with the invention operates in normal propulsion as a conventional windsurfing sail.

However, since the sail unit in accordance with the invention is constituted by two wings 5, 6 having an equal total sail area, the transverse dimensions are smaller.

The maneuverability of this sail unit is considerably improved as a result. In particular, tacking movements are performed very rapidly by lifting the sail unit 1 above the user's head, by turning the board 2 with the feet, then by engaging the other end of the leading edge 7 within the receptacle 31. This operation is distinctly easier and faster than with conventional wind-surfing boards on which the pilot must necessarily advance towrds the front end of the board, pass around the mast and then take a few steps toward the rear while gripping the other element of the wishbone.

Taking into account the small overall size of the sail unit 1, the user can set this latter in the vertical position without difficulty in order to obtain maximum traction.

Furthermore, the invention makes it possible to use the sail unit 1 without connecting it to the board 2, as shown in FIG. 2. The pilot has the possibility of three-dimensional orientation of the sail unit 1 and in particular by judiciously placing this latter substantially in a horizontal position in order to produce a force whose vertical component or sustentation force becomes of optimum value. In particular, this sustentation force can substantially balance the weight of the sail unit 1. By judiciously utilizing the sustentation force, the sail unit has a very low apparent weight, with the result that the user exerts a low effort in order to maintain this latter.

Figure 7:
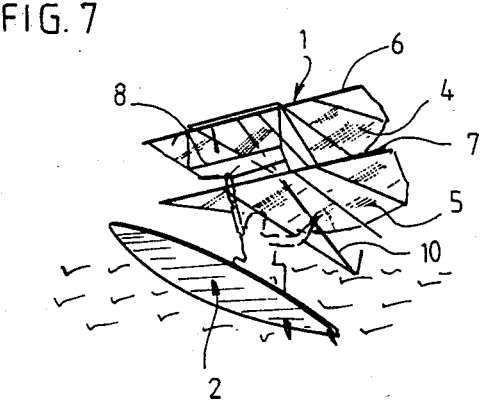
FIG. 7 shows the sail unit in sustentation.

In addition, when the wind is sufficient, this sustentation force can attain high values and enable the pilot to perform a prolonged jump while "planing" for several seconds, during which time the pilot is suspended from the sail unit 1 whose leading edges 6, 7 are substantially horizontal and maintains the board 2 lifted above the water by means of his feet engaged within the pockets 21 (see FIG. 7).

The use of the sail unit 1 independently of the moving support constituted by the board 2 under all wind conditions is possible or optimized only by virtue of the multiplane concept of this latter. In fact, a conventional triangular monoplane sail has either small dimensions and therefore an insufficient useful surface area or conventional dimensions which permit normal propulsion of the board but, in this case, its dimensions are such that the lower end of the sail will almost inevitably come into contact with the surface of the water when it is inclined at an angle close to the vertical.

Furthermore, when the wind is light and the sail unit does not lift of its own accord, the user of a monoplane sail will not be able to hold it for a very long time without the aid of a support such as a mast.

As is well-known to salors, the slats 17 or 17a of the sail unit 1 serve to prevent oscillations of the trailing edge which reduce the efficiency of the sail unit.

The two rods 10a, 11a of the triangle which are disposed longitudinally are gripped alternately by the pilot with one hand whilst the other hand grasps the crossbar 8a of this triangle.

The tests which have produced the most spectacular results have been carried out with a biplane sail unit, each wing of which has a spread of 3 meters and a depth of 1.40 meter and is made of plastic foam of the polyethylene type in sheet form.

The area of each wing is 3 square meters, namely a total sail-unit area of 6 square meters. However, this total area can vary between 4 and 10 square meters.

The two wings under test are maintained in rigid relation to each other by a supporting frame consisting of thin tubes of glass fibers, the surface of which has been glazed by heating. The planes of these wings are substantially parallel and located at a distance of 40 centimeters. The so-called leeward wing is relatively displaced at a distance of 60 centimeters in the forward direction with respect to the so-called windward wing.

The complete sail unit together with its supporting frame and its accessories has a weight of 6 kilograms as in the case of a complete triangular monoplane sail of conventional type which measures 4.70 m×2.10 m.

However, as described earlier, the biplane sail unit 1 in accordance with the invention offers a spectacular advantage of maneuverability under all circumstances. Since the half-height of this sail unit is 1.50 m, a pilot of normal stature holds the unit above the water with great ease under all circumstances. This is not the case when a pilot employs a triangular monoplane sail having a half-height of at least 2 meters under normal conditions of navigation and when carrying out tacking movements by displacing the complete sail from one side to the other, the mast being separated from the board.

Consideration has been given in the foregoing to the use of the sail unit 1 in conjunction with a "speed" windsurfing board 2 or with a "jumping" board. This sail unit can be used with any type of one-man moving support used for the purpose of sport and capable of floating, rolling or gliding, on water, along the ground, on snow or on ice.

Figure 5:
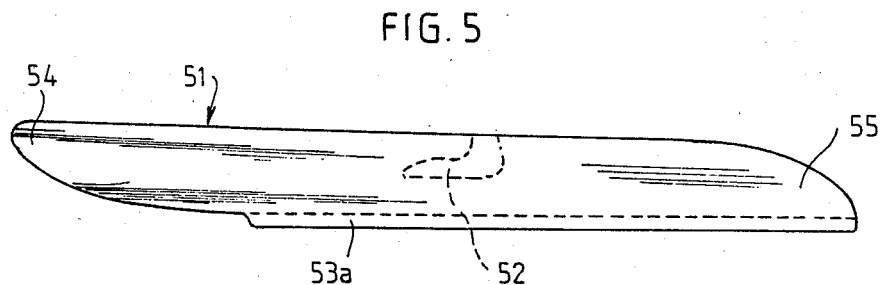
FIG. 5 is a profile view of a water-ski which can be equipped with a sail unit in accordance with the invention.
Figure 6:
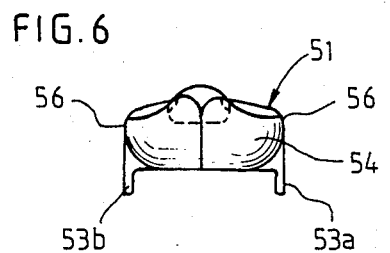
FIG. 6 represents a front view of the same water-ski.

This sail unit is particularly advantageous when used in combination with a pair of water-skis such as those illustrated in FIGS. 5 and 6.

These skis 51 are substantially identical and each have an elongated shape which can be formed, for example, in the same manner as sailboards of rigidified low-density plastic foam coated with a layer of plastic material of suitable impermeability.

These water-skis 51 have a front portion 54 in the form of a pointed cutwater which is curved up to a slight extent, a central portion having a substantially constant cross-section and a flattened rear portion 55. The side walls 56 are provided substantially between the front third and the rear end with two flattened longitudinal projections, the external surface of which is located transversely with respect to the top face of the ski.

There is formed at the center of this top face of the ski 51 a cavity 52 which is similar to that of a shoe.

The user engages one foot in each of the cavities 52 of the two skis 51 and maintains the biplane sail unit in the manner described above.

The displacement of these skis within the water in the longitudinal direction calls for only a very slight effort whereas the displacement in a transverse direction (referred-to by sailors as leeway) calls for a substantial effort.

In the same manner as windsurfing boards, skis of known types usually have a rear fin-keel forming a downward projection of several tens of centimeters.

In contrast, although the ski 51 illustrated in FIGS. 5 and 6 is intended to provide a drift-resistant surface area of greater value than that of a fin-keel, it forms a projection of only a few centimeters. The user can very often completely withdraw one ski from the water while standing on the other without having to lift the ski above water to the considerable height of the fin-keel of known skis.

Thus in the same manner as a snow skier who climbs up a slope by "side-stepping", the water-skier can beat up to windward by "side-stepping". This spectacular advantage enables the pilot, especially at the time of racing events, to beat up to windward of his buoy without having to tack if circumstances are such that he is located at a few meters to leeward.

In fact, at the time of sailing races in which it is necessary to pass a certain number of buoys on the correct side, the pilot who is located even very slightly to leeward of the buoy is obliged to carry out at least two tacks which result each time in a loss of speed, especially by reason of the fact that the sail no longer produces any driving action during his change of orientation with respect to the wind.

Furthermore, the overall dimensions of the skis as shown in FIGS. 5 and 6 are reduced to an appreciable exent, with the result that handling and transportation are made particularly easy.

Figure 8:
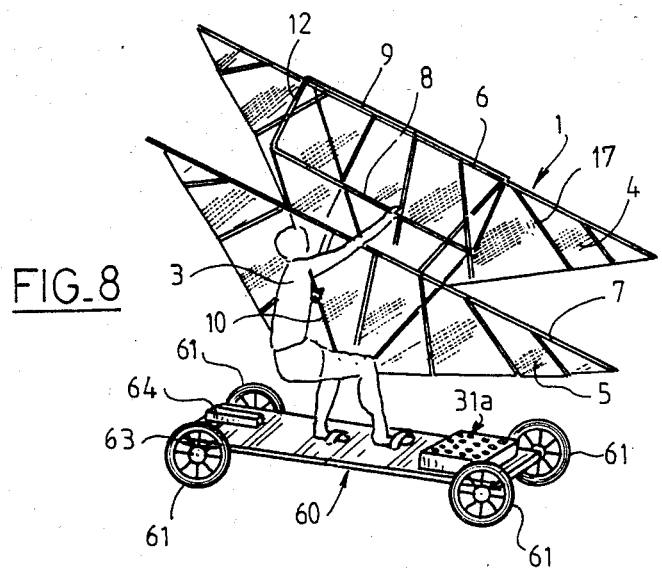
FIG. 8 is a representation of a wheeled board employed with a biplane sail unit in accordance with the invention.

Another use of the sail unit in accordance with the invention is illustrated in FIG. 8 in which the sail unit 1 as shown is being held in position by the user 3 whose two feet bear on a board 60 fitted with wheels 61. The rear axle 63 is articulated with respect to the axis of the board by means of a device 64 of the type employed in skate-boards which orients the axle as a function of the inclination of the board with respect to the surface of the ground. This wheeled board is provided in addition with a receptacle 31a which is similar to that described earlier with reference to FIGS. 1 and 2.

In the same manner as described above in connection with a water-board, the user can employ the sail unit in propulsion when the end of the leading-edge rod 16 is engaged within the receptacle 31a and with a sustentation component of appreciable value when the sail unit is employed at a large angle of inclination with respect to the ground as shown in FIG. 8.

The pilot orients the direction of forward travel of the board by inclining this latter with his feet in the same manner as the user of a skate-board and, by virtue of the biplane arrangement of the sail unit, he can orient the unit in all judicious directions without touching the ground and can in particular turn either left or right.

Since the sail unit in accordance with the invention is constituted by two wings 4, 5 held together by a supporting frame of associated interengaged tubes attached by clamping members, it is possible to separate the two wings in a short time. The windward wing 5 provided with the leading-edge rod 16 associated with the triangle 10a, 11a, 8a alone constitutes another independent sail unit which is reduced to an efficiency of one-half and can be employed in the same manner as the biplane sail unit, especially in a very strong wind, or else by a beginner or by a child.

As will be readily apparent, the invention is not limited to the examples described in the foregoing but extends to any variant or combination with other known devices within the capacity of any one versed in the art.

Thus the multiplane sail unit can have any shape other than that described and the supporting frame can be constructed in a different manner. Each wing can be constructed from any material in sheet form or can even be rigid. It can have a variable volume and thickness and an aircraft wing profile, especially of the delta-wing type. The supporting frame can be designed in forms other than that described and can even be constituted by profiled surfaces or volumes.

Moreover, the moving support can be quite different from those described; any support having a direction of displacement with low preferential friction with respect to the other directions having high resistance would be suitable even if the pilot cannot orient the preferential direction under the action of his feet.

Figure 9:
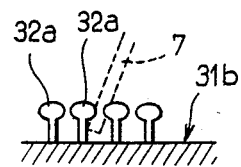
FIG. 9 is a diagram showing an alternative form of the sail-unit support.

The device for mechanical association of the support which is intended to cooperate with one end of the leading edge of the wing can be entirely different from those described. Thus the support 31b of FIG. 9 is provided with rubber mushrooms 32a which are capable of retaining the end 7 of the leading-edge rod of the sail unit.

I claim:

1. Sailboards comprising a sail assembly and a floatboard (2) supporting said sail assembly, said sail assembly comprising two wings (4, 5) in relatively displaced relation to each other, said two wings having substantially parallel leading edges (6, 7), said two wings being connected together by a rigid supporting frame ensuring a constant relative positioning of said wings, this supporting frame being provided with gripping means (8, 10) for the user, one (7) of said leading edges having an end (7a) which is removably and pivotably fixed to the floatboard (2), thus permitting the user to move the said sail assembly during navigation between a position where said end (7a) of said one leading edge is pivotably fixed to the floatboard and a position where said sail assembly is dissociated from the floatboard and maintained by the user in a substantially horizontal position to produce a sustentation effect.

2. Sailboard according to claim 1, wherein said end (7a) of said leading edge is romovably fixed in a recess provided on the floatboard.

3. Sailboard according to claim 1, wherein said floatboard is provided with a plurality of recesses (32) adapted to receive the end (7a) of the leading edge and permitting adjustment of the position of said end (7a) on the floatboard.

4. Sailboad according to claim 1, wherein the two wings (4, 5) are displaced with respect to each other in a tranverse direction relatively to their leading edges (6, 7).

5. Sailboard according to claim 1, wherein the two wings (4, 5) have substantially the same surface area.

6. Sailboard according to claim 1, wherein one of the two wings (5) has a substantially greater span than the other (4).

7. Sailboard according to claim 1, wherein the total sail area of the wings is substantially within the range of 4 to 10 m$^2$.

8. Sailboard according to claim 1, wherein at leat one of the wings (4, 5) has a substantially rectilinear leading edge (6, 7) and a trailing edge (4b, 5b) having an ovalized contour.

* * * * *